United States Patent [19]
Sirat et al.

[11] Patent Number: 5,220,618
[45] Date of Patent: Jun. 15, 1993

[54] CLASSIFICATION METHOD IMPLEMENTED IN A LAYERED NEURAL NETWORK FOR MULTICLASS CLASSIFICATION AND LAYERED NEURAL NETWORK

[75] Inventors: Jacques-Ariel Sirat, Limeil-Brevannes; Jean-Pierre Nadal, Gentilly, both of France

[73] Assignee: U.S. Philips Corp., New York, N.Y.

[21] Appl. No.: 653,592

[22] Filed: Feb. 8, 1991

[30] Foreign Application Priority Data

Feb. 9, 1990 [FR] France ............................ 90 01528

[51] Int. Cl.⁵ ........................................... G06K 9/00
[52] U.S. Cl. ............................................ 382/14; 395/23
[58] Field of Search .............. 382/14, 15, 36; 395/21, 395/23, 24

[56] References Cited

U.S. PATENT DOCUMENTS 4,682,365  7/1987  Orita et al. ............................ 382/14
5,060,278 10/1991  Fukumizu ............................ 382/14

OTHER PUBLICATIONS

R. P. Lippmann, "An Introduction to Computing with Neural Nets", IEEE ASSP Magazine, Apr. 1987, pp. 4-22.
S. I. Gallant, "Optimal Linear Discriminants", IEEE proc. 8th Conf. on Pattern Recognition, Paris (1986), pp. 849-852.
M. Mezard & J. P. Nadal, "Learning in Feedforward Layered Networks: the tiling algorithm", J. Phys. A: Math. Gen. 22 (1989), pp. 2191-2203.
Koutsougeras et al "Training of a Neural Network For Pattern Classification Based On An Entropy Measure", IEEE Conf on Neural Networks, San Diego, CA (1988) pp. I-247-I-254.

Primary Examiner—Leo H. Boudreau
Attorney, Agent, or Firm—David Schreiber

[57] ABSTRACT

Classification method implemented in a layered neural network, comprising learning steps during which at least one layer is constructed by the addition of the successive neurons necessary for operating, by successive dichotomies, a classification of examples distributed over classes. In order to create at least one layer starting with a group of examples distributed over more than two classes, each successive neuron tends to distinguish its input data according to two predetermined sub-groups of classes peculiar to the said neuron according to a principal components analysis of the distribution of the said input data subjected to the learning of the neuron of the layer in question.

7 Claims, 4 Drawing Sheets

CLASSIFICATION METHOD IMPLEMENTED IN A LAYERED NEURAL NETWORK FOR MULTICLASS CLASSIFICATION AND LAYERED NEURAL NETWORK

BACKGROUND OF THE INVENTION

The invention relates to a classification method implemented in a layered neural network, comprising learning steps during which at least one layer is constructed by the addition of the successive neurons required for executing by successive dichotomies, a classification of examples divided into classes.

It also relates to a neural network implementing this method.

Neural networks are applied for classification problems, in particular for recognition of shapes and characters, and for speech signal processing, image processing, data compression, etc.

Neural networks are constituted from non-linear automatons generally connected to each other by synapses having synaptic coefficients. They allow the processing of problems which are difficult to process by conventional sequential computers.

The two commonest types of network are:

fully connected networks known as Hopfield networks layered networks: the neurons are grouped in successive layers, each neuron is connected to all of the neurons of the following layer.

In the most general structure, information is fed forward from input terminals (passive) to an input layer (active) then successively to each hidden layer (active) until the output layer (active). In the most reduced structure, information is fed forward from input terminals (passive) to a single (=output) layer (active).

These systems are capable of learning by example or by self-organizing. The long computing times of sequential computers can be considerably reduced by the parallel carrying out of the operations which comprise learning phases and resolution phases.

In order to carry out a given operation, the neural networks must previously learn to carry it out. This phase, called the learning phase, makes use of examples. For many algorithms, the output results to be obtained with these examples are known in advance. Initially, the neural network which is not yet adapted to the intended task, will supply erroneous results. An error is then determined between the results obtained and those which should have been obtained and, on the basis of an adaptation criterion, the synaptic coefficients are modified in order to allow the neural network to learn the chosen example. This stage is reiterated over the batch of examples considered as necessary for a satisfactory learning of the neural network.

Learning algorithms are divided into two classes:

local learning, in which the modification of a synaptic coefficient $C_{ij}$ connecting a neuron j to a neuron i depends only on the information localized on the neurons i and j, non-local learning, in which such modification depends on information located in the entire network. A well-known example is that of the backward propagation of the error in layered networks.

Various types of neural networks have been described in the article by R. P. LIPPMANN, "An introduction to computing with neural nets" IEEE ASSP Magazine, Apr. 1987 pp. 4 to 22.

In these neural networks the organization of the structure is fixed (in layers or fully connected) and the connections between neurons are fixed in advance.

The purpose of the learning which is then carried out is to seek an optimum structure by proposing different architectures and then making an a posteriori choice, as based on processing results.

An algorithm which allows the architecture to be determined during the learning has been proposed by: M. MEZARD and J. P. NADAL in "Learning in Feed-forward Layered Networks: the tiling algorithm" J. Phys. A: Math. Gen. 22 (1989) pp. 2191-2203.

For this purpose the learning is initialized by optimizing the synaptic coefficients of a first neuron present in a particular layer and if this neuron does not suffice to accomplish the classification task an additional neuron is added in the current layer or in the following layer which is thus initialized. This approach allows the learning of the architecture and of the layered network parameters (Multilayer Perceptrons) while separating the outputs into two classes.

But such a neural network structure does not allow executing classification problems for examples distributed into several classes.

SUMMARY OF THE INVENTION

The problem which arises therefore consists in being able to process such problems while maintaining the determination of the architecture during the learning.

The solution consists in that in order to create at least one layer starting with a group of examples divided into more than two classes, each successive neuron tends to distinguish its input data according to two predetermined sub-groups of classes peculiar to the said neuron according to a principal components analysis of the distribution of the said input data subjected to the learning of the neuron of the layer in question.

The method will therefore use a father neuron and then successor neurons which together will allow the separation of the group of examples distributed into several classes into sub-groups of examples each forming a single class. In order to operate the learning, each neuron will therefore implement several successive steps:

A-Entry of the non-homogeneous group of examples,

B-Division of the examples of the non-homogeneous group into two sub-groups of classes based on a principal components analysis, C-Learning of a father neuron by computing its synaptic coefficients in order that it tends to distinguish the group of examples into two sub-groups of examples approaching, as closely as possible, the first division into two sub-groups of classes, D-Testing the homogeneity of each of the two sub-groups of examples in order to determine whether or not they include a single class of examples, E-Among the said sub-groups of examples, selection of a single non-homogeneous sub-group, F-Division of the examples of the non-homogeneous sub-group into two sub-groups of classes based on a principal components analysis, G-Learning of a following neuron by computing its synaptic coefficients in order that it tends to distinguish the selected non-homogeneous sub-group of examples into two sub-groups of examples approaching, as closely as possible, the following division into two sub-groups of classes, H-Action of the said following neuron on all of the non-homogeneous sub-groups of examples distinguished by the preceding neuron in order to generate new sub-groups of examples, I-Testing the homogeneousness of each of these new generated sub-groups of examples, J-Extraction of examples belonging to non-homogeneous sub-groups of examples, K-Continue processing, beginning at stage E, on the remaining sub-groups of non-homegeneous examples until homogeneous sub-groups formed of single classes are obtained.

This separation of examples into two sub-groups of examples operated by a neuron tends to conform to a division of classes carried out by a principal components analysis of the distribution of examples by operating the division into two sub-groups of classes in relation to the centre of gravity of the distribution of examples.

The principal components analysis is a statistical method which allows a set of vectors to be described with the aid of a mean vector having d principal directions and corresponding variances. This method is described hereafter.

In order to carry out the learning, the synaptic coefficients of a father neuron are computed in order to distinguish from a group M of examples, a particular sub-group of classes P. The distinction can consist in distinguishing the sub-group P in a sub-group $M^1+$.

The distinction of the group $M^1+$ of the particular class P which it is desired to carry out with the aid of the neuron can only be obtained imperfectly when the classes of examples are not linearly separable. Thus examples having the same class as the particular class P can be found in the complementary sub-group $M^1-$ after distinction by the first neuron.

The group $M^1+$ and the complementary group $M^1-$ are then tested for homogeneousness in order to determine whether they include a single class. If both these groups ar homogeneous, the distinction of these sub-groups is completed. If one or other of these groups is non-homogeneous, a non-homogeneous sub-group is selected and a successor neuron is generated which distinguishes the non-homogeneous group into two new groups. In order to do this the method first distinguishes the classes present in the sub-group into two sub-groups of classes according to a principal components analysis, then it computes the synaptic coefficients for this successor neuron which operates this distinction according to a criterion of dichotomy according to the two sub-groups of classes. Then the successor neuron is made to act, with its synaptic coefficients thus determined, on all of the non-homogeneous groups generated by the preceding neuron (one or two groups). This procedure of dichotomy of examples and generation of successor neurons is iterated over the successive generations.

When all of the classes are thus distinguished, the learning phases are then complete and the neural network can be used in full operational mode in order to perform classifications.

After distinction of the classes into two sub-groups, the learning of each neuron operating a distinction over two sub-groups can have several variants. Preferentially, use is made of the Pocket algorithm used by M. MEZARD and J. P. NADAL and described by S. GALLANT in "Optimal linear discriminants" IEEE Proc. 8th Conf. on Pattern Recognition Paris (1986). This Pocket algorithm can be used for operating the distinction carried out by each neuron.

It is also possible for each neuron to use a learning criterion of "Perceptrons" which reupdate the synaptic coefficients on the basis of errors which for any example characterize the difference between a result obtained at the output of the neural network and the expected result. These learning criteria are known to those skilled in the art.

The computation of the synaptic coefficients of any neuron is intended to make the neuron in question distinguish either the group of input examples subjected to the action of the neurons of the input layer, or the selected non-homogeneous groups respectively subjected to the action of the neurons of the following layers each time according to two predetermined groups of classes.

In order to carry out the learning of any neuron the computation of its synaptic coefficients implements either the "Pocket" algorithm, or a learning rule of the "Perceptron" type, or a learning rule of the Hebb type (see R. P. LIPPMANN already cited and R. MEIR and E. DOMANY in "Integrated Learning in a layered Feed-Forward Neural Network" Phys. Rev. A, vol. 37, No. 7, 1988, p. 2660).

The invention also relates to a neural network implementing the method. The neural network is firstly constructed and is then used for performing the learnt classification tasks. The neurons forming the first layer have the function of separating input data space. Each of them therefore supplies a binary state on outut. The set of these binary states constitutes the input data for the following layer. This set of binary states can be decoded with the aid of successive layers forming the neural network. It can also be decoded with the aid of a memory which stores the classes of examples as a function of the binary states of the neurons of the first layer. In operating mode, this memory is addressed by these binary states and then read in order to supply the classifications carried out.

BRIEF DESCRIPTION OF THE FIGURES

The invention will be better understood with the aid of the following figures given by way of non-limiting examples and in which.

DESCRIPTION OF A PREFERRED EMBODIMENT

Figure 1:
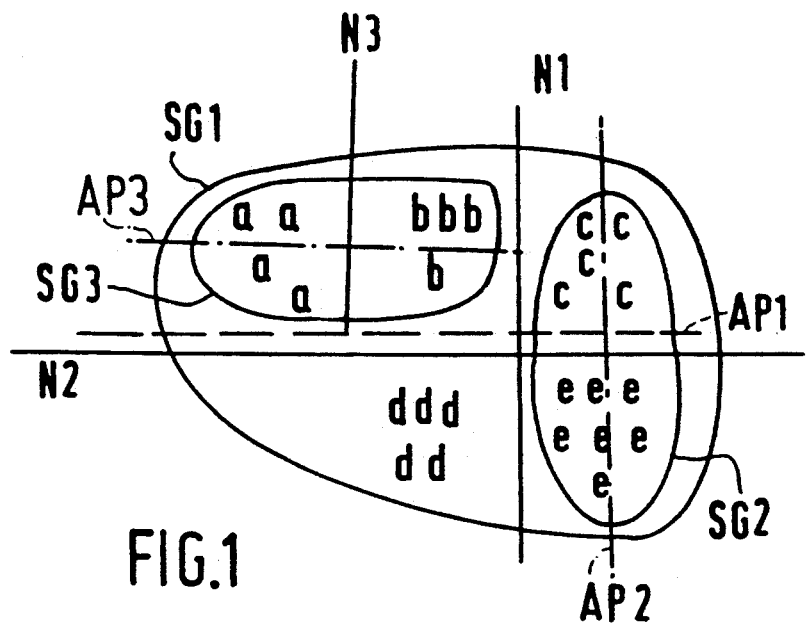
FIG. 1 is a representation in the space of the inputs of the mode of action of the separators on the basis of examples divided into K classes.

FIG. 1 shows a notional two-dimensional space twenty-five examples, each located at a position given by their respective parameter values, and each being represented by a letter a, b, c, d, e corresponding to the particular class to which that example belongs. The examples are grouped into respective (sub)-groups SG1, SG2, SG3, the group SG1 effectively comprising all examples used. Each (sub)-group has a respective principal axis AP1, AP2, AP3, the generation of which will be treated in detail hereinafter, in particular the useage thereto of principal axis indicates the general spatial orientation of the (sub)-group in question. For each sub-group, a respective dichotomy line has been shown, which generally runs transverse to the sub-group's principal axis and which divides the sub-group into two parts. This dichotomy is executed by a respective single neuron indicated according to N1, N2, N3 respectively. The execution is trated in detail hereinafter.

Figure 2:
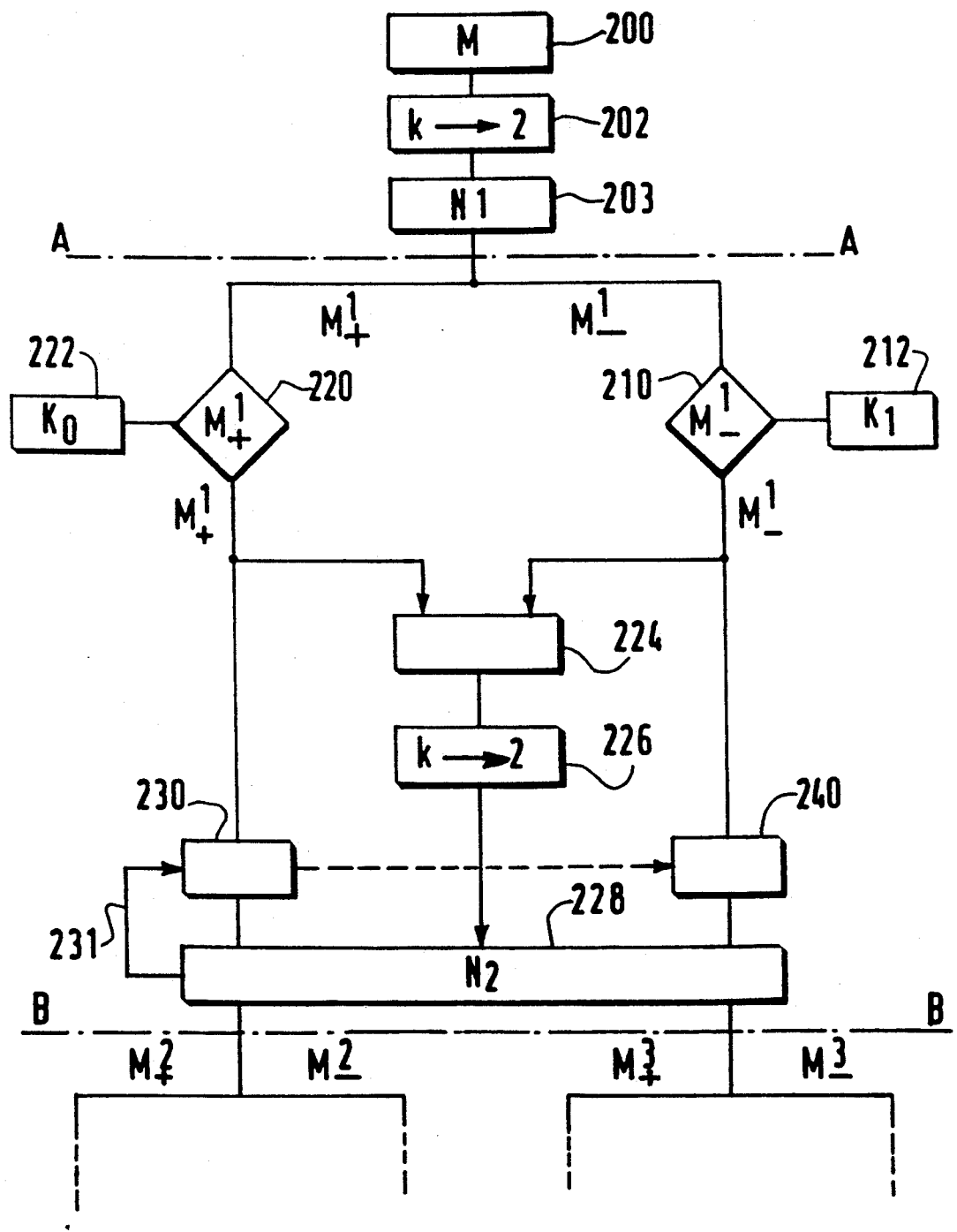
FIG. 2 is a flowchart which shows the mechanism of separation of the classes and the sub-groups of examples concerned for the learning of the layered neural network.

FIG. 2 is a flowchart relating to a layered neural network showing the steps of the method. The method operates on the basis of a group of M selected examples (step 200) given for carrying out a learning operation by the neural network for adapting it to the execution of a defined task. This group M of examples is non-homogeneous by definition, which means that its examples belong to more than one class. The learning is understood here in a broad sense and consists not only in determining the required synaptic coefficients (the learning of the neural network) but simultaneously in determining the number of neurons required for accomplishing this task. Therefore it also determines the size of the neural network.

The group M of examples is formed for example of k different classes. Step 202 consists in dividing the k classes into two sub-groups of classes $G^1+$ and $G^1-$ which reduces the problem of classification to a problem of classification of two sub-groups of classes $G^1+$ and $G^1-$. During step 203 the method determines the synaptic coefficients of a particular father neuron which operates on the entire group of examples M. These synaptic coefficients are determined so that the neural network separates as correctly as possible, the sub-groups of examples, $M^1+$ and $M^1-$ according to their known sub-groups of classes, $G^1+$ and $G^1-$, respectively. This learning process is preferably carried out by the Pocket algorithm described hereafter. Under these conditions the learning proves to be optimum both with regard to the duration of execution and with regard to the hardware necessary for implementing it. The output of the neural network is analyzed for correct or incorrect allocation of each class to the intended sub-group. To clarify matters, it is for example possible to try to isolate a sub-group of class $G^1+$ from the group of examples M.

The sub-group of classes $G^1-$ is then formed by the group of examples M from which the sub-group of classes $G^1+$ has been extracted. The learning of the father neuron will thus tend to make $M^1+$ correspond with $G^1+$ and $M^1-$ with $G^1-$.

The sub-group of classes $G^1+$ can be either homogeneous or non-homogeneous. As the classes are not a priori linearly separable, the sub-groups $M^1-$ thus separated can itself include elements of the sub-group of class $G^1+$.

The examples constituting the sub-groups of examples $M^1+$ and $M^1-$ are first processed separately. The homogenousness of $M^1+$ and $M^1-$ is examined; steps 220 and 210.

In effect the father neuron has the task of distinguishing a predefined sub-group of classes. If the group of examples $M^1+$ (respectively $M^1-$) is homogeneous, i.e. if it contains only examples of a same class, these examples are thus distinguished; step 222 (respectively 212) (classes $K_0$, $K_1$).

If the sub-group of examples $M^1+$ (respectively $M^1-$) is non-homogeneous, i.e. if it contains examples of different classes, it is necessary to continue the distinction.

In order to do this, there is selected (step 224) a non-homogenous sub-group of examples, either $M^1+$ or $M^1-$. This choice can be made for example by taking the most numerous sub-group or the sub-group including the lowest (generally the new value of k is lower than formerly) of number of classes or by any other criterion.

The sub-group $M^1+$ or $M^1-$ thus selected is divided into classes which operation consists, just as for step 202, in dividing the k classes of the selected sub-group into only two sub-groups of classes (step 226). This reduces the problem of classification into k classes to iterative classification into two classes. The learning of the neuron $N_2$ (step 228) consists in carrying out a first distinction of the selected sub-group of examples into two sub-groups which tends to make the two new sub-groups of examples correspond to the two sub-groups of predetermined classes. The synaptic coefficients of the neuron $N_2$ are thus determined. They then remain unchanged and the neuron $N_2$ executes a second distinction over the totality of the sub-groups of examples $M^1+$ and $M^1-$ generated by the preceding neuron. For this purpose a command 231 is issued which validates the processing of $M^1+$ (step 230) and of $M^1-$ (step 240) by the neuron $N_2$.

At the end of these last two stages the neuron $N_2$ has respectively divided the examples of the sub-groups $M^1+$ and $M^1-$ into two new sub-groups of examples $M^2+/M^2-$ and $M^3+/M^3-$, respectively.

These four sub-groups are then processed by a successor neuron $N_3$ (not shown) according to the same mechanism. The sequence of steps located between the dotted and dashed lines A—A and B—B (FIG. 2) is repeated identically while operating on four sub-groups instead of on two sub-groups.

The construction of the current layer is completed when all of the examples of the group M have thus been processed and when each isolated sub-group contains only examples belonging to a single class. The method may be considered complete at this point, or it may possibly construct an additional layer if considered necessary.

At the end of the construction of the first layer, the distinction between multiclasses data words can be operated. But the output states configurations can be distributed over an output number that can be too high. It can so be wished to operate a transcoding to reduce the number of outputs. So a following layer is constructed with the same method as the one already described for the first active neuron layer. The outputs of this first layer are used as inputs for the second layer. The same processes can be reiterated for other layers. At the last layer outputs, output states configurations are obtained which are distributed on a reduced output number. These configurations allow to distinguish the several classes of the data words introduced on the inputs. The number of neurons and their synaptic coefficients are thus determined by the method iself and the learning operation is completed for this group of examples. The neural network can then be used for executing classification tasks.

Figure 3:
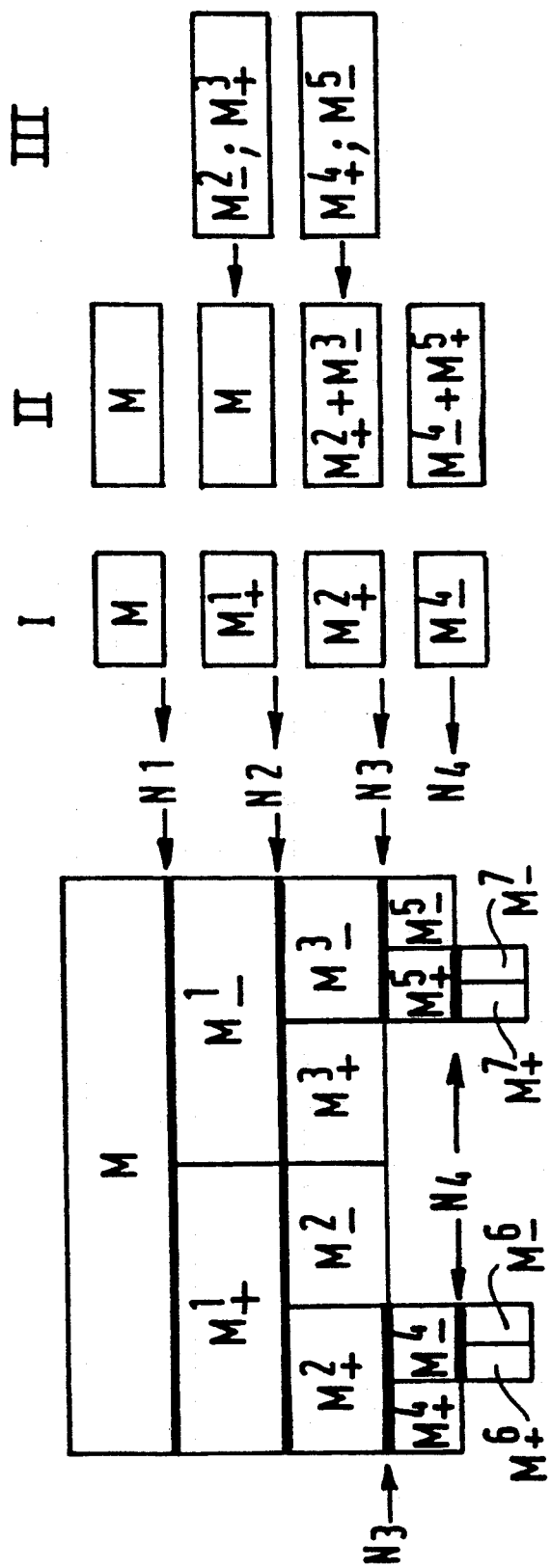
FIG. 3 is a representation of the separation of the examples.
Figure 5:
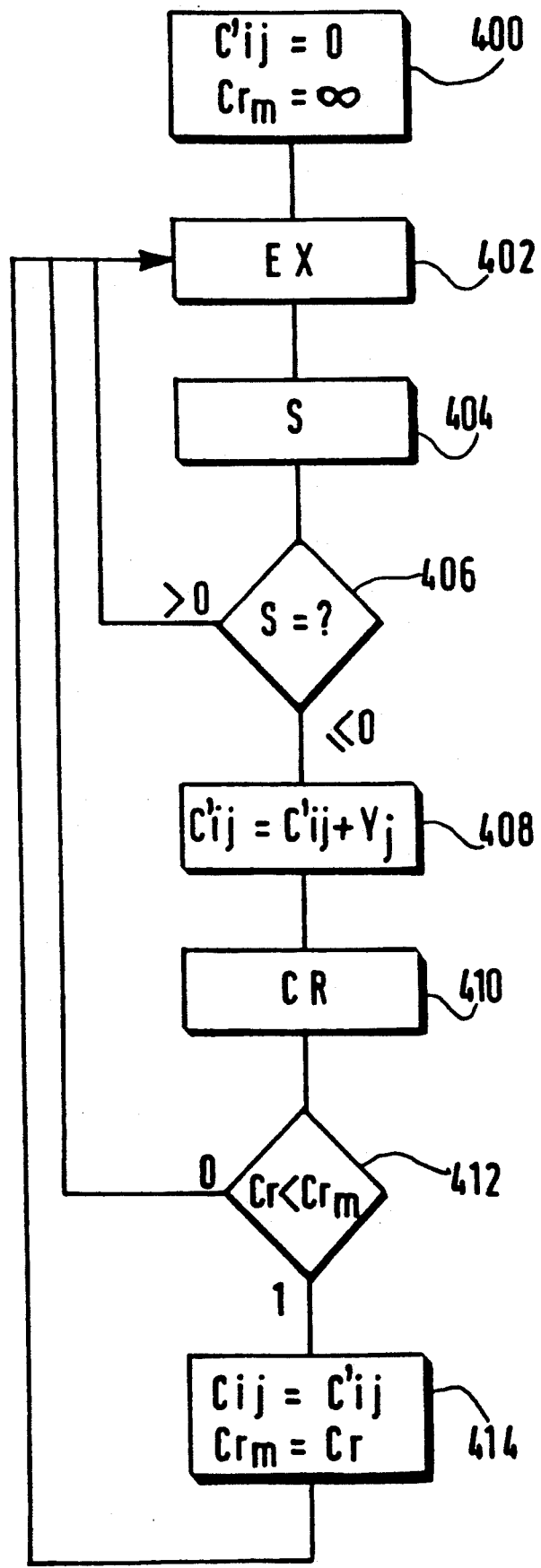
FIG. 5 is an example of an algorithm constituted by the Pocket algorithm allowing the separation between two sub-groups of classes to be operated.

FIG. 3 is another representation of the separation steps operated by the method according to the invention. The father neuron $N_1$ (represented by a thick line) operates on the non-homogeneous group M of examples in order to carry out the separation into the sub-groups of examples $M^1+$ and $M^1-$.

In this representation it is assumed that both sub-groups of examples $M^1+$ and $M^1-$ are non-homogeneous. One of the sub-groups is selected, for example $M^1+$, in order to execute the learning by a successor neuron $N_2$ by computing its synaptic coefficients. When this learning is complete, the neuron $N_2$ retains its synaptic coefficients and operates the division over the group $M^1+$ and $M^1-$ which it separates into $M^2+/M^2-$ and $M^3+/M^3-$ respectively. Let it be assumed that $M^2-$ and $M^3+$ are homogeneous; the method then continues with the two remaining non-homogeneous sub-groups $M^2+$ and $M^3-$. The sub-group $M^2+$ is for example selected for computing the synaptic coefficients of a successor neuron $N_3$. Then the neuron $N_3$ divides the sub-groups $M^2+$ and $M^3-$ respectively into the sub-groups $M^4+/M^4-$ and $M^5+/M^5-$. If, for example, only $M^4-$ and $M^5+$ are non-homogeneous a successor neuron $N_4$ operates as before in order to separate the sub-groups $M^6+/M^6-$ and $M^7+/M^7-$ assumed to be homogeneous. The learning of the neuron network for this classification task is then complete and it can be used in full operational mode for operating this type of task on other examples.

The right-hand section of FIG. 3 shows, in column I, the group of examples used by the neuron placed on the same line for computing the synaptic coefficients of that neuron.

Column II shows the group of examples on which the neuron placed on the same line then carries out the distinction of the sub-groups of examples.

Column III shows, for each of the said neurons, the sub-groups of homogeneous examples which are then extracted before the action of the successor neuron.

According to the invention, the division towards which the neuron must tend consists in using a principal components analysis of the distribution of examples. The principal components analysis is a statistical method which allows a group of N vectors $y^\mu$ (points in a space of d dimensions) to be described with the aid of mean vector $$<\vec{y}> = \frac{1}{N} \Sigma\, y^\mu$$

having d principal directions and the d corresponding variances $\sigma^2$. The method is described in detail in "Elé ments d'Analyse de Données" by E. DIDAY, J. LEMAIRE, J. POUGET, E. TESTU, Publisher: Dunod (1982) p. 167.

Figure 4A:
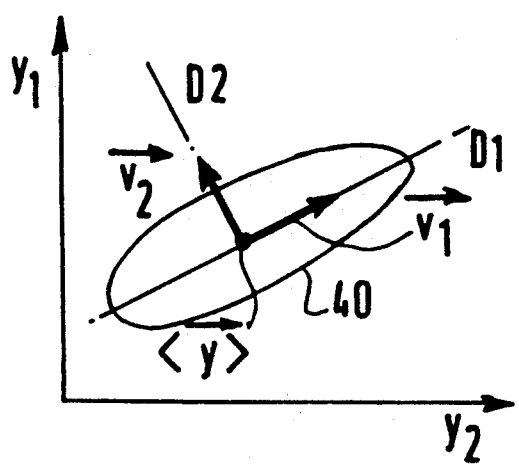
FIGS. 4A and 4B are a representation of the principal components of distrubution and an example of division into classes.

The simple case of FIG. 4A represents a distribution 40 in a two-dimensional space with a standard deviation ratio $\sigma 1/\sigma 2$ substantially equal to 3. For this distribution there is defined a mean $<\vec{y}>$ and principal components $\vec{V}_1, \vec{V}_2$ along characteristic directions $D_1, D_2$. If the principal components are classified according to decreasing variances, the first characteristic direction indicates the direction along which the norm of $(\vec{y}^\mu - <\vec{y}>)$ varies most with the example $\mu$. When there is a group of examples allocated to the classes $C_1, C_2, \ldots C_k$, to which it is desired to apply a linear separator (neuron) in order to progress in the k classes classification, it is advantageous to separate the k classes into two separate groups $G+/G-$ as follows:

i) the means $<\vec{y}>$ and the first principal component $\vec{V}_1$ of the set of examples $\vec{y}^\mu$ are computed by carrying out for example a complete principal components analysis by computing and diagonalizing of the covariance matrix, followed by selection of the component of maximum variance, ii) the centers of gravity corresponding to each class C are computed:

$$<\vec{y_c}> = \frac{1}{N_c} \sum_c y^\mu$$

where $\Sigma_C$ indicates a summing over the examples whose class in C, and Nc is the number of examples in the class C, iii) a grouping is carried out of the classes whose centre of gravity satisfies:

$$(<\vec{y}>_c - <\vec{y}>).V_1 > 0$$

in $G+$, and the others in $G-$.

Figure 4B:
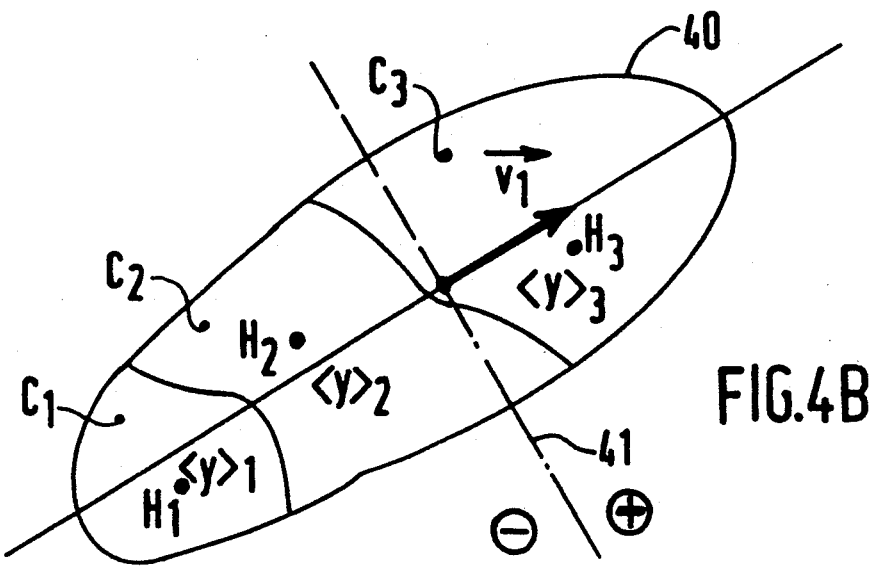

The method of principal components analysis is illustrated by FIG. 4B for a two-dimensional distribution having three classes. The distribution 40 includes the classes $C_1$, $C_2$ and $C_3$, each having a mean value $<y>_1$, $<y>_2$ and $<y>_3$, and a centre of gravity $H_1$, $H_2$ and $H_3$. According to i), the computation of the mean and of the first principal vector determines $<y>$ and $\vec{V}_1$. According to ii), the computation of the centres of gravity associated with the classes determines $H_1$, $H_2$ and $H_3$. The grouping of the classes according to iii) enables the three classes to be distributed over two subgroups of classes with the aid of the separator 41.

In this case the distribution of the examples into two sub-groups of classes carries out a distribution with respect to the axis passing through the centre of gravity of the distribution of examples perpendicular to a principal direction, the centre being determined during the processing by a principal components analysis. The essential advantage of this method with respect to other choices (selection of a class for example) is that the linear separator will be more balanced, i.e. it will separate the examples into two less different sub-sets of population.

The learnings carried out by the neurons in order to determine their synaptic coefficients for making the best possible approach to the desired sub-groups of classes are preferably carried out according to the Pocket algorithm used by M. MEZARD and J. P. NADAL in "Learning in Feedforward Layered networks: the tiling algorithm" J. Phys. A: Math. Gen. 22 (1989) pp. 2191-2203 and described by S. GALANT "Optimal Linear Discriminants" IEEE proc. 8th Conf. on Pattern Recognition, Paris (1986).

In order to do this for each example chosed at random, the output potential of a neuron is computed. If this potential satisfies the stability criterion $S \geq 0$ another example is chosen. If this potential does not satisfy the stability criterion (S<0), new synaptic coefficients are computed which are used for updating the former synaptic coefficients only if they satisfy a minimum error criterion. All examples are used for determining the synaptic coefficients of the neuron in question, the "Pocket" algorithm converging towards the optimum synaptic coefficients for operating the dichotomy of the non-homogeneous class.

This algorithm (tiling) was designed for constructing a multi-layer neural network by adding neurons until the code (+/−;1/0) represented by the units of the layer in progress are faithful, i.e. two examples of different classes do not have the same code over the entire layer in question. Each layer is thus constructed on the basis of examples of the preceding layer.

FIG. 4 shows the flowchart of the Pocket algorithm which operates the separation of a group of examples into two groups.

For a given neuron its synaptic coefficients $C_{ij}$ are initialized at zero and a maximum error criterion $C_{rm}$ random is initialized at a very high value (step 400). A random example EX is taken (step 402) for which there is determined (step 404) a stability value S such that:

$$S = \sum_{s=0}^{N} C_{ij} \cdot y_j^\mu$$

where i is the index of the neuron being analysed j is the index of the neurons or of the inputs which are connected to it $y_j^\mu$ is the jth component of the example $\mu$ presented at the input of neuron i.

This stability S is tested (step 406). If it is positive, the stability is sufficient and another example is chosen.

If this stability S is negative or zero, synaptic coefficients $C'_{ij}$ are determined such that: $C'_{ij}(\text{new}) = C'_{ij}(\text{old}) + y_j$ (step 408).

Each new synaptic coefficient $C'_{ij}$ thus determined must satisfy an error criterion $C_r$ (step 410) which determines for example the number of examples for which the stability is of the wrong sign. If this criterion $C_r$ is less than a maximum value $C_{rm}$ of the criterion (step 412), the synaptic coefficients $C'_{ij}$ determined are used for updating (step 414) the previously stored synaptic coefficients $C_{ij}$.

Similarly, the maximum value $C_{rm}$ is updated. All the examples are thus successively used for computing and then possibly updating the synaptic coefficients of this neuron i. At the end of this learning, the separation operated by this neuron i is tested by determining, for an example of a given group, the result obtained (separation into two groups of classes: +/−;1/0). If the separation does not supply groups of homogeneous classes another neuron is added in the layer and the Pocket algorithm is again used in the same way.

The invention also relates to a neural network provided with means implementing the method. The network comprises a computing unit which determines the output states $V_i$ of the neurons on the basis of the input potentials $V_j$ according to the following:

$$V_i = \Sigma C_{ij} V_j$$

where $C_{ij}$ are the synaptic coefficients which connect the neuron i to the inputs j (or neuron j). For that, each input vector component is connected to an input terminal. The input vectors $V_j$ arrive successively on the input terminal according to the method. A first neuron (father neuron) is created. It receives all the input vectors components arriving on the input terminals. If the first neuron is not sufficient to distinghish the classes, a second neuron is generated which receives also all the input vector components arriving on the input terminals. The generationof the neural net is realized according to the same manner for all the neurons required.

This computing unit operates according to the mechanisms known to those skilled in the art and described for example in the article by R. P. LIPPMANN already cited. A host computer manages all of the operations.

The layered neural network can be formed of successive layers having neurons whose learning is carried out according to the described method. It is also possible for the neural network to be formed from a single layer, obtained according to the described method, whose neurons act as separators in the inputs space. The states of the outputs of the neurons of this layer can then be processed directly by a memory which stores the classes of examples as a function of the binary states of the neurons of the said layer.

We claim:

1. A method of classifying a group of non-homogenous data into K homogenous classes by training a neural network device, said device including at least one processing element, having a classification coefficient, comprising the steps of:
   a) dividing said group of non-homogenous data into two subgroups of data;
   b) applying one of said two subgroups of data to said processing element to generate a classification coefficient for said processing element;
   c) applying said group of non-homogeneous data to said processing element;
   d) processing said group of non-homogeneous data into two further groups of data in accordance with the division of said two subgroups of data in step a);
   e) testing the homogeneity of each of said two further groups to determine if each of said further subgroups contains only a single class;
   f) storing a location of said processing element and recording said homogeneous class of one of said further groups of data when said processing element distinguishes said single class;
   g) if one of said further groups is non-homogeneous, generating a second processing element; and
   h) repeating steps a)–d) until said further groups of data are classified by said successive processing element so that each further group corresponds to a homogeneous class.

2. A method of classifying non-homogeneous data into more than two classes of homogeneous data by training a neural network, said network including a plurality of processing elements, said processing elements having at least one network parameter stored in an interconnection between the processing elements that specify weights of the interconnections, said method comprising the steps of:
   a.) dividing the non-homogeneous data into a first subgroup of data and a second subgroup of data in accordance with a principal components analysis;
   b.) applying the non-homogeneous data to a first processing element and propagating in a forward propagating step until generation of a first group of result data and second group of result data;
   b.) adjusting the network parameters in accordance with the principal components analysis of said first subgroup of data and said second subgroup of data;
   c.) determining whether the first group of result data and the second group of result data are non-homogeneous and wherein said at least one of said first group of result data and said second group of result data is non-homogeneous, generating a further processing element coupled to said processing element; and d.) repeating steps a)-c) with respect to the first and second groups of result data and said further processing element until each of said subgroups is homogeneous.

3. The method of claim 1, wherein the step of dividing is performed in accordance with a principal components analysis.

4. The method of claim 2, wherein said network parameters are calculated using one of a Pocket algorithm, a Perceptron learning algorithm and a Hebb algorithm.

5. The method of claim 1, wherein said network parameters are calculated using one of a Pocket algorithm, a Perceptron learning algorithm and a Hebb algorithm.

6. The method of claim 1, wherein K is greater than 2.

7. A neural network device for classifying a group of non-homogeneous data into four homogeneous classes, comprising:

an input for receiving said non-homogeneous data;

a first processing element connected to said input, said processing element using a synaptic coefficient for separating said group of non-homogeneous data into two further groups of non-homogeneous data;

a second processing element coupled to said first processing element, said second processing element for receiving said two further groups of non-homogeneous data and separating said two further groups of non-homogeneous data into four groups of homogeneous data;

means for adjusting the network parameters of each of said processing elements; and means for validating whether an output of first and second processing elements is homogeneous data.

* * * * *